United States Patent [19]

Takahashi et al.

[11] Patent Number: 4,618,844
[45] Date of Patent: Oct. 21, 1986

[54] SEMICONDUCTOR PRESSURE TRANSDUCER

[75] Inventors: Yukio Takahashi, Katsuta; Michitaka Shimazoe; Yoshitaka Matsuoka, both of Mito, all of Japan

[73] Assignee: Hitachi, Ltd., Tokyo, Japan

[21] Appl. No.: 494,075

[22] Filed: May 12, 1983

[30] Foreign Application Priority Data

May 14, 1982 [JP] Japan .................. 57-79867

[51] Int. Cl.$^4$ .............................. G01L 1/22
[52] U.S. Cl. ........................... 338/2; 338/5; 338/36; 338/42; 73/727; 73/777; 73/774
[58] Field of Search ........................ 338/2-4, 338/42, 36, 5; 357/26; 73/777, 774, 727

[56] References Cited

U.S. PATENT DOCUMENTS

| 3,456,226 | 7/1969 | Vick | 338/4 |
| 3,662,312 | 5/1972 | Thorp et al. | 357/26 |
| 3,961,358 | 6/1976 | Polinsky | 357/52 X |
| 4,125,820 | 11/1978 | Marshall | 357/26 X |
| 4,151,502 | 4/1979 | Kurihara et al. | 338/2 |
| 4,173,900 | 11/1979 | Tanabe et al. | 338/4 X |
| 4,317,126 | 2/1982 | Gragg, Jr. | 338/4 X |
| 4,364,276 | 12/1982 | Shimazoe et al. | 73/721 |

FOREIGN PATENT DOCUMENTS

| 55-33092 | 3/1980 | Japan | 338/42 |
| 55-555575 | 4/1980 | Japan | 357/26 |

Primary Examiner—Clarence L. Albritton
Assistant Examiner—M. M. Lateef
Attorney, Agent, or Firm—Antonelli, Terry & Wands

[57] ABSTRACT

In a semiconductor pressure transducer in accordance with the present invention, an oxide film is formed on a semiconductor base having a strain gauge resistor element for the purpose of protecting the strain gauge resistor element. Over the oxide film, a conductive metal film is formed which does not overlap with the strain gauge resistor element through said oxide film.

15 Claims, 6 Drawing Figures

SEMICONDUCTOR PRESSURE TRANSDUCER

BACKGROUND OF THE INVENTION

The present invention relates to a semiconductor pressure transducer and in particular to a semiconductor pressure transducer which is stable under exterior inductive noise or pollution.

A semiconductor pressure transducer for converting variation of pressure, differential pressure or the like into that of a resistance value, obtained by forming a strain gauge resistor element on a substrate of semiconductor monocrystal such as silicon, is known. Within the silicon monocrystal substrate acting as a strain causing body included in such a semiconductor pressure transducer, a strain gauge resistor element having a conductivity which is opposite to that of the substrate is selectively and integrally formed. The strain gauge resistor element is covered with silicon dioxide film for the purpose of passivation and insulation. In addition, an electrode of metal such as aluminium is provided to feed the electrical output of the strain gaguge resistor element to the outside.

In a semiconductor pressure transducer of such configuration, the movement of ions such as ions of sodium attached or deposited onto the surface of the silicon dioxide film which covers the strain gauge resistor element or the movement of ions within the silicon dioxide film varies the potential of the silicon dioxide film. This results in the drawback that the output of the transducer is varied according to a change of temperature or environment and time lapse.

As described in Japanese Patent Application Laid-Open No. 33092/80, it is proposed to form a conductive film such as a gold film on the silicon dioxide film which covers the strain gauge resistor element. In such configuration, the movable ions on the surface of the silicon dioxide film and within the silicon dioxide film are fixed by the conductive film. Accordingly, the above described drift problem of the transducer output with time is resolved. In this case, however, a new different problem involving the performance characteristic is produced. Namely, the output, shifted by the temperature variation, does not return to its initial state even if the temperature is restored to its initial value. In other words, hysteresis with temperature change occurs. This temperature hysteresis phenomenon is based upon the difference between the heat expansion rate of the conductive film such as gold film and that of the silicon monocrystal substrate. The conductive film with a large heat expansion rate breaks down on account of the temperature variation. Accordingly, a remnant strain occurs in the strain gauge resistor element which is just under the conductive film, causing the temperature hysteresis phenomenon.

SUMMARY OF THE INVENTION

An object of the present invention is to provide a semiconductor pressure transducer having decreased output drift and temperature hysteresis.

According to the present invention, a conductive metal film is positioned along the longitudinal direction of the strain gauge resistor element and adjacent to the conductive metal film but not above the strain gauge resistor element. Even if the conductive metal film breaks down on account of the temperature variation and a remnant strain is produced in the conductive film, the strain gauge resistor element is not significantly affected by the remnant strain. The temperature hysteresis is lessened.

DESCRIPTION OF THE PREFERRED EMBODIMENT

Figure 1:
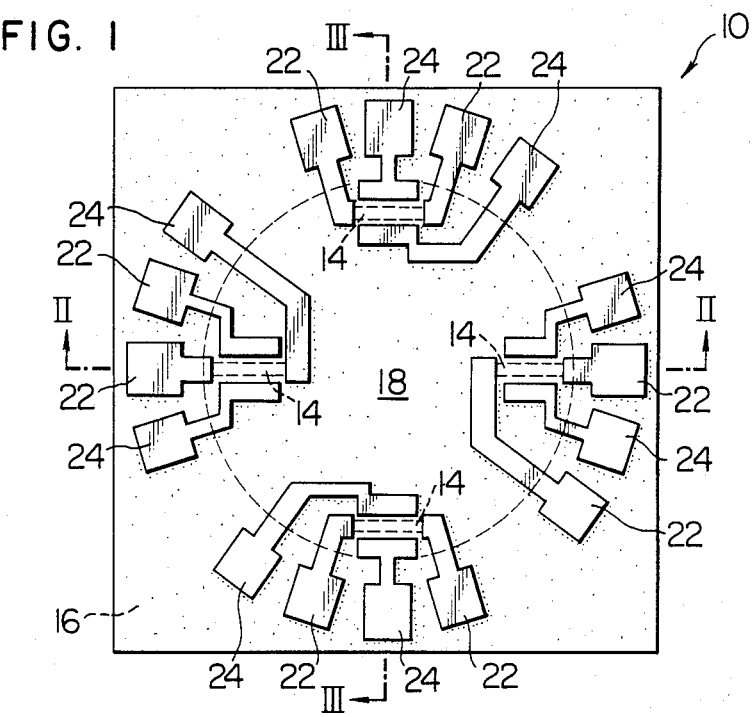
FIG. 1 is the top view of an embodiment of semiconductor pressure transducer according to the present invention.
Figure 2:
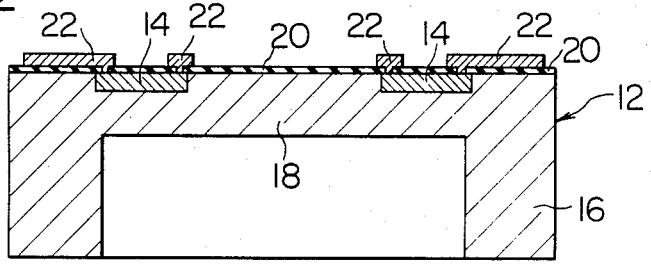
FIG. 2 is a sectional view of the semiconductor pressure transducer along the line II—II illustrated in FIG. 1.
Figure 3:
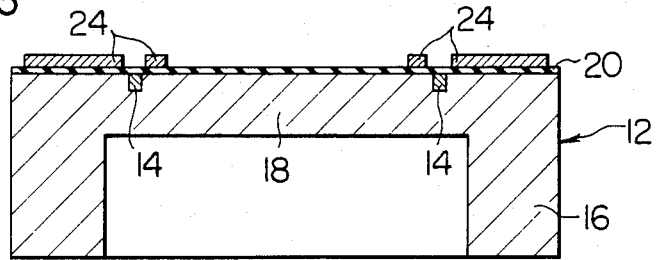
FIG. 3 is a sectional view of the semiconductor pressure transducer along the line III—III illustrated in FIG. 1.

FIGS. 1 to 3 show the top view and sectional view of the semiconductor pressure transducer according to the present invention.

A semiconductor pressure transducer 10 consists of a base 12 comprising monocrystalline silicon of the N-type having a (100) surface and a P-type strain gauge resistor element 14 which is formed on the base 12. The base 12 has a thick fixed portion 16 on its exterior periphery and a thinner strain causing portion 18 on its center. In the strain causing portion 18, the P-type strain gauge resistor element 14 is formed in parallel with the <110> axis direction wherein the sensitivity is maximized by diffusion or ion implantation. After the strain gauge resistor element 14 is formed on one face of the base 12, the other face of the base 12 is processed by machine processing, etching or the like to be formed into a cup shape. The strain gauge resistor element 14 is positioned near the fixed portion 16 on the exterior periphery of the base 12. The strain gauge resistor element and the fixed portion 16 constitute a Wheatstone bridge which produces a differential output.

The face whereon the strain gauge resistor element 14 has been formed is covered by a silicon dioxide film 20 for protecting the strain gauge resistor element 14. Further thereupon aluminium wiring 22 is provided for taking out the output from the strain gauge resistor element 14. The aluminium wiring 22 extends to the fixed portion 16 to feed the output to the outside. On the silicon dioxide film 20, a conductive film 24 is formed along the longitudinal direction of the strain gauge resistor element 14 and adjacent thereto. It is desirable for the conductive film 24 to be thin and have a length which is close to that of the strain gauge resistor element 14. However, if the thickness of the conductive film 24 is smaller than 1 μm, the temperature hysteresis is very small and can be disregarded. Therefore, the thickness of the conductive film 24 does not have to be extremely thin with respect to the thickness of the wiring 22. If the length of the conductive film 24 along the strain gauge resistor element 14 is 0.6 to 0.8 times as long as that of the strain gauge resistor element 14, the output from the resistor element does not change with the passage of time.

Figure 4:
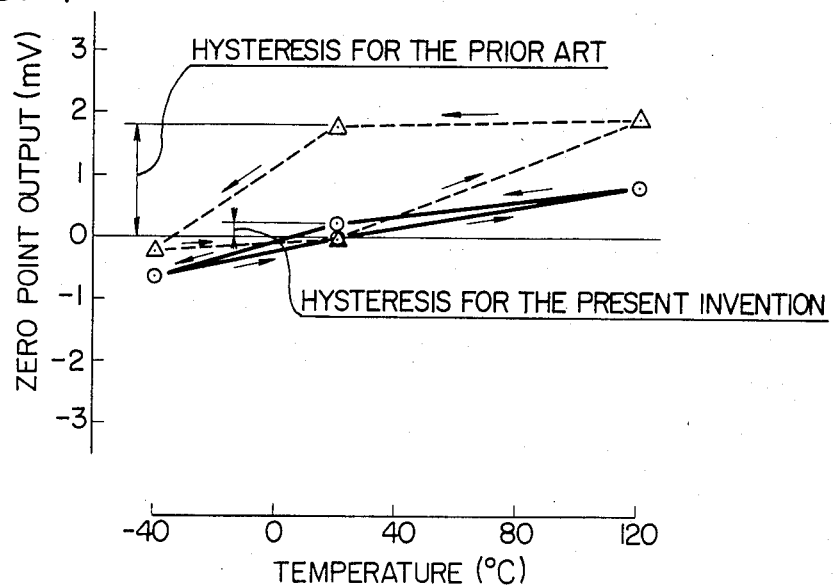
FIG. 4 shows temperature hysteresis characteristics.

The gap between the conductive films 24 disposed on the both sides of the strain gauge resistor element 14 is very small and substantially equal to the width of the strain gauge resistor element 14, so that the movable ions residing in and disposed on the film 20 covering the element 14 are attracted to the interface between the silicon dioxide film and the element 14 by keeping the potential of the conductive film 24 to a positive constant level. Therefore, movable ions cannot be induced because the electrons are accumulated on the surface of the x-type silicon base 12 and the depletion layer in the interface of the film 20 is shortened. Consequently, the leakage current is not changed readily by exterior pollution or the like, and the drift with the passage of time can be avoided. Further, the conductive film is not formed right above the strain gauge resistor element 14. That is, the conductive film 24 is separated from the strain gauge resistor element 14 by the silicon dioxide film 20 and the film 24 is formed so that it will not overlap the strain gauge resistor element 14 through the silicon dioxide film 20. Therefore, the strain gauge resistor element 14 is not significantly affected by the mechanical deformation of the conductive film 24 caused by the temperature variation or the like. FIG. 4 shows the temperature hysteresis characteristics. In the case when the conductive film 24 is formed right above the strain gauge resistor element 14, a temperature hysteresis of approximately 1.8 mV is incurred as illustrated by the dotted line. In the embodiment of the present invention, the value of the temperature hysteresis has been reduced to approximately 0.2 mV as illustrated by the solid line.

Figure 5:
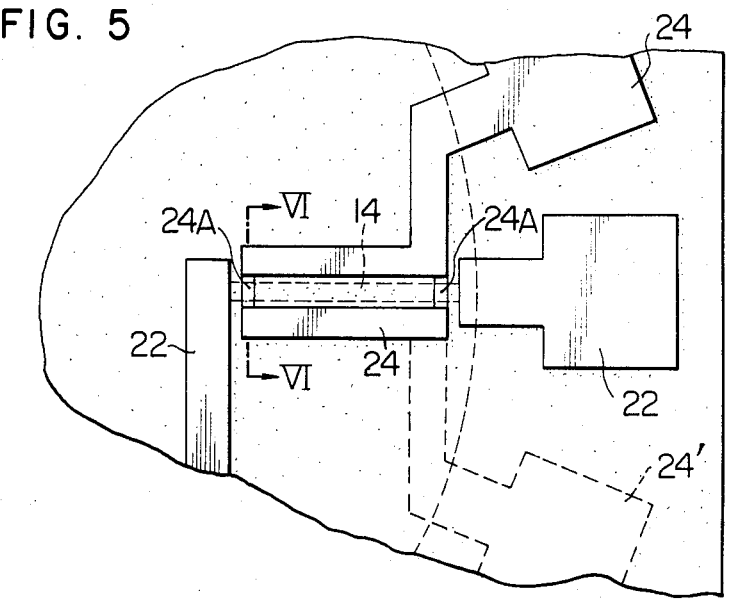
FIG. 5 is an enlarged top view of a portion of another embodiment of semiconductor pressure transducer according to the present invention.
Figure 6:
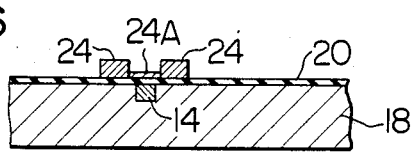
FIG. 6 is a sectional view of the semiconductor pressure transducer along the line VI—VI illustrated in FIG. 5.

FIG. 5 and FIG. 6 show another embodiment of the present invention. FIG. 5 is an enlarged view of a portion of the semiconductor pressure transducer. FIG. 6 is a sectional view of the semiconductor pressure transducer along the line VI—VI illustrated in FIG. 5. At illustrated in FIG. 5 and FIG. 6, both conductive films 24 separated by the strain gauge resistor element 14 may be coupled through electrical connection means 24 A to form an integrated conductive film. In this case, the electrical connection means 24 A is disposed opposite the strain gauge resistor element 14 through the silicon dioxide film 20. Accordingly, it is desirable to form the electrical connection means 20 A as fine and thin as possible. The thickness is desired to be 0.1 μm or less. Thus, it is possible to decrease to half the led portion (as illustrated by the dotted line in FIG. 5) of the conductive film which does not exert direct influence on shielding for the strain gauge resistor element.

We claim:

1. A semiconductor pressure transducer comprising:
    a base comprising a semiconductor monocrystal;
    a strain gauge resistor element formed on said base;
    an oxide film formed on said base in contact with said strain gauge resistor element for protecting said strain gauge resistor element; and
    a conductive layer formed on said oxide film, said layer not overlapping said strain gauge resistor element through said oxide film, being adjacent two opposed sides of said strain gauge resistor element and functioning to cause movable ions within and on the oxide film in proximity to the strain gauge resistor element to be fixed.

2. A semiconductor pressure transducer according to claim 1, wherein the two opposed sides of said strain gauge resistor element extend along a longitudinal direction and said conductive layer comprises two conductive films provided adjacent to both sides of said strain gauge resistor element along its longitudinal direction.

3. A semiconductor pressure transducer according to claim 1, wherein said conductive layer is made of aluminium.

4. A semiconductor pressure transducer according to claim 1, wherein the length of said conductive layer is 0.6 to 0.8 the length of said strain gauge resistor element.

5. A semiconductor pressure transducer according to claim 1, wherein said base has a (100) surface and said strain gauge resistor element is arranged in parallel with a <110> axis.

6. A semiconductor pressure transducer according to claim 2, wherein said conductive films provided on both sides of said strain gauge resistor element are coupled to each other by an electrical connection means which is so positioned on said oxide film and crosses said strain gauge resistor element over said oxide film.

7. A semiconductor pressure transducer according to claim 6, said electrical connection means is thinner than said conductive films.

8. A semiconductor pressure transducer comprising:
    a base comprising a n-type silicon monocrystal having a thin strain causing portion on a central part and a thick fixed portion on an exterior periphery;
    a p-type strain gauge resistor element formed in said strain causing portion;
    an oxide film formed on said base in contact with said strain gauge resistor element for protecting said strain gauge resistor element;
    aluminum wiring formed on said oxide film for outputting the output of said strain gauge resistor element; and
    a conductive layer formed on said oxide film, said layer not overlapping said strain gauge resistor element through said oxide film, being adjacent two opposed sides of said strain gauge resistor element and functioning to cause movable ions within and on the oxide film in proximity to the strain gauge resistor element to be fixed.

9. A semiconductor pressure transducer according to claim 8, wherein said base has a (100) surface and said strain gauge resistor element is arranged in parallel with the <110> axis and near said fixed portion.

10. A semiconductor pressure transducer according to claim 8 wherein the two opposed sides of said strain gauge resistor element extend along its longitudinal direction and said conductive layer comprises two conductive films provided adjacent to both sides of said strain engage resistor element along its longitudinal direction.

11. A semiconductor pressure transducer according to claim 8, wherein said conductive layer is made of aluminium.

12. A semiconductor pressure transducer according to claim 8, wherein the length of said conductive layer is 0.6 to 0.8 the length of said strain gauge resistor element.

13. A semiconductor pressure transducer according to claim 8, wherein said base has a (100) surface and said strain gauge resistor element is arranged in parallel with a <110> axis.

14. A semiconductor pressure transducer according to claim 10, wherein said conductive films provided on both sides of said strain gauge resistor element are coupled to each other by an electrical connection means which is so positioned on said oxide film and crosses said strain gauge resistor element over said oxide film.

15. A semiconductor pressure transducer according to claim 14, wherein electrical connection means is thinner than said conductive films.

* * * * *